United States Patent [19]
Barkat

[11] Patent Number: 6,038,457
[45] Date of Patent: Mar. 14, 2000

[54] APPARATUS AND METHOD FOR DETECTING AND POWERING AN ACCESSORY

[75] Inventor: Shakil Barkat, Bartlett, Ill.

[73] Assignee: Motorola, Inc., Schaumburg, Ill.

[21] Appl. No.: 08/985,988

[22] Filed: Dec. 5, 1997

[51] Int. Cl.[7] .................................................. H04Q 7/32
[52] U.S. Cl. .......................... 455/556; 455/569; 455/572
[58] Field of Search ................................... 455/572, 556, 455/557, 571, 90, 127, 350; 320/15, 34, 54, 39

[56] References Cited

U.S. PATENT DOCUMENTS

| | | | |
|---|---|---|---|
| 4,636,741 | 1/1987 | Mitzlaff .................................. 330/127 |
| 4,654,882 | 3/1987 | Ikeda ....................................... 455/88 |
| 5,164,652 | 11/1992 | Johnson et al. .......................... 320/2 |
| 5,237,257 | 8/1993 | Johnson et al. .......................... 320/2 |
| 5,257,413 | 10/1993 | Warner et al. ......................... 455/557 |
| 5,333,177 | 7/1994 | Braitberg et al. ..................... 455/559 |
| 5,336,984 | 8/1994 | Mischenko et al. ..................... 320/2 |
| 5,392,023 | 2/1995 | D'Avello et al. ....................... 358/400 |
| 5,487,099 | 1/1996 | Maekawa ................................ 379/59 |
| 5,506,490 | 4/1996 | DeMuro .................................. 320/23 |
| 5,657,371 | 8/1997 | Suomi et al. .......................... 455/418 |

Primary Examiner—Fan S. Tsang
Assistant Examiner—Blane J. Jackson
Attorney, Agent, or Firm—Rolland R. Hackbart

[57] ABSTRACT

A radiotelephone (100) is coupled to accessory (200) by way of a novel interface provided by connector (190). Accessory (200) is a headset including a microphone (220) and a speaker (230) that may be plugged into a jack in radiotelephone (100) and worn by the user. Accessory (300) provides an RS-233 serial interface for communicating information between radiotelephone (100) and a personal computer (400). Controller (130) of radiotelephone (100) detects the presence of a 10K ohm resistor (202) to determine that accessory (200) is coupled to connector (190), and the presence of a 22K ohm resistor (202) to determine that accessory (300) is coupled to connector (190). When accessories (200) and (300) are detected, a liner regulator (116) is swathed on by controller to provide a 2.7V voltage source for powering accessories (200) and (300).

9 Claims, 2 Drawing Sheets

APPARATUS AND METHOD FOR DETECTING AND POWERING AN ACCESSORY

BACKGROUND OF THE INVENTION

The present invention is generally related to radiotelephones, and more particularly to an apparatus and method for detecting and powering a headset accessory for cellular radiotelephones.

Conventional portable cellular radiotelephones may be coupled to a variety of accessories including different size batteries as illustrated in U.S. Pat. Nos. 5,164,652 and 5,237,257, an auxiliary battery as illustrated in U.S. Pat. No. 5,684,384, an external power adapter as illustrated in U.S. Pat. No. 5,506,490, a power booster as illustrated in U.S. Pat. No. 4,636,741, and a headset. The presence of the foregoing accessories may be determined by detecting resistors of a predetermined value or by detecting an electrical signal ground or predetermined voltage on an input signal. Many of these accessories are mounted in a vehicle where they can be powered from the vehicle's battery. However, when a vehicular power source is not available, there is a need for powering an accessory directly from a radiotelephone.

DESCRIPTION OF THE PREFERRED EMBODIMENT

Figure 1:
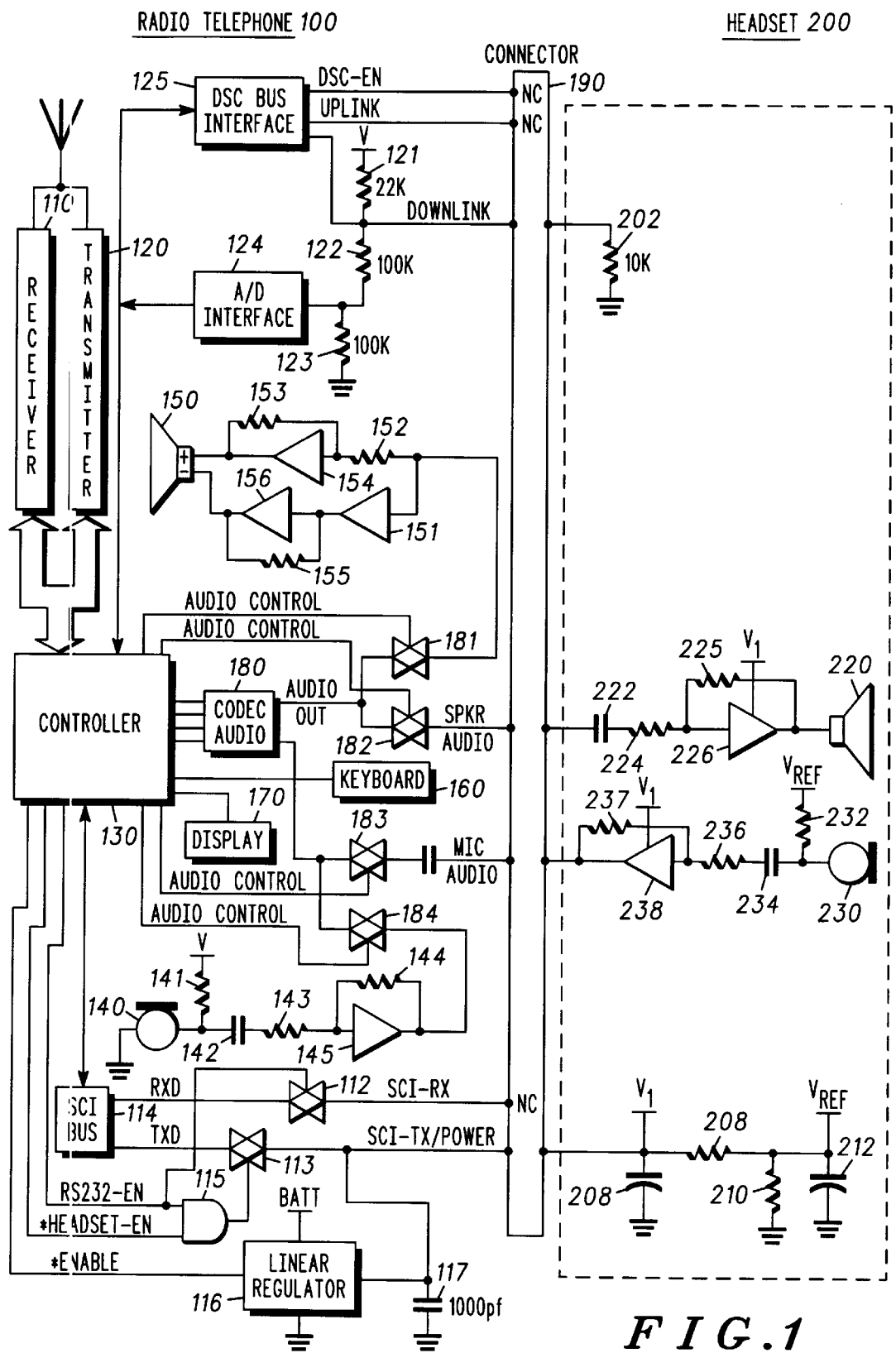
FIG. 1 is a block diagram of a cellular radiotelephone 100 and a headset accessory 200.

Referring to FIG. 1, there is illustrated a block diagram of a cellular radiotelephone 100 and headset accessory 200, embodying the present invention. In the preferred embodiment, radiotelephone 100 is a cellular telephone such as those manufactured by and available from Motorola, Inc. Radiotelephone 100 is coupled to accessory 200 by way of an interface provided by connector 190. Accessory 200 is a headset including a microphone 220 and a speaker 230 that may be plugged into a jack in radiotelephone 100 and worn by the user in a manner similar conventional stereo headphones. Accessory 200 enables to user to privately listen and speak during a radiotelephone call. Other accessories including but not limited to a handsfree accessory and a desktop charger accessory may be coupled to radiotelephone 100 by way of the interface provided by connector 190.

Radiotelephone 100 includes a radio frequency (RF) receiver 110 a RF transmitter, a controller 130, a microphone 140, a speaker 150, a keyboard 160 for entering information, a display 170 for visually displaying information and status, and interface circuitry coupled to controller 130 for producing interface signals on the accessory interface provided by connector 190. Controller 190 is a conventional microcomputer system that includes a microprocessor device, a non-volatile memory device with a stored program, a volatile memory device for storing data, and an interface device for producing output control signals and receiving input control signals.

Accessory 200 includes predetermined impedance 202, which in the preferred embodiment is a resistor having a predetermined value to indicate that accessory 200 is a headset. Impedance 202 has a value of 10K ohms for the headset accessory 200. Accessory 200 also includes capacitor 208 coupled to the SCI-TX/POWER bus for providing voltage source V1 to headset accessory 200 and its audio amplifying circuitry 220–226 and 230–238. Voltage source V1 is coupled to amplifier 226, amplifier 238, and resistors 208 and 210 which act as a divider for providing voltage source Vref at capacitor 212 and resistor 232. Accessory 200 also includes capacitor 222 coupled to speaker audio bus of connector 190 for capacitvely coupling speaker audio signals to audio amplifier 226 by way of gain setting resistors 224 and 225. Amplifier 226 amplifies the speaker audio signals and couples them to speaker 220. Accessory 200 further includes microphone 230 for providing microphone audio signals. Microphone 230 is coupled by resistor 232 and capacitor 234 to audio amplifier 238 by way of gain setting resistors 236 and 237. Amplifier 238 amplifies the microphone audio signals and couples them to the speaker audio bus of connector 190.

The SCI-RX bus and SCI-TX/POWER bus of connector 290 in FIG. 1 are provided by switches 112 and 113, respectively. SCI bus device 114, which may be a conventional serial communications interface device such as a UART device, is coupled to controller 130 for generating the RXD and TXD signals coupled to switches 112 and 113, respectively. Switches 112 and 113 are enabled by the RS232-EN control signal from controller 130, which is activated when controller 130 is coupled to and communicating data at a rate of 9.6K bits per second via the SCI-RX bus and SCI-TX/POWER bus of connector 190 to an accessory (not shown), such as a conventional desktop charger accessory. The RS232-EN control signal is combined with the *HEADSET-EN control signal by AND gate 115 and then applied to switch 113. That is switch 113 may be enabled by the RS232-EN control signal when a desktop charger accessory is coupled to connector 190.

The SCI-TX/POWER bus of connector 290 in FIG. 1 is also coupled to capacitor 117 and linear regulator 116, which is a voltage source for producing the V1 voltage in response to the *ENABLE control signal from controller 130. Linear regulator 116 produces a 2.7 DC voltage that is coupled to capacitor 208 for powering headset accessory 200. According to a feature of the present invention, capacitor 208 is disposed in headset accessory 200 and acts as a bypass capacitor for stabilizing linear regulator 116. Accordingly, bypass capacitor 208 has rather large capacitance value.

Since the SCI-TX/POWER bus carries high speed data at a rate of 9.6K bits per second when coupled to a desktop charger accessory, bypass capacitor 208 can not be disposed in radiotelephone 100 since it would attenuate the high speed data due to its large capacitance value. Therefore, bypass capacitor 208 is disposed in headset accessory 200 when the SCI-TX/POWER bus provides a 2.7 DC voltage from linear regulator 116.

According to another feature of the present invention, the *ENABLE control signal is generated when controller 130 reads the value of impedance 202 of headset accessory 200 by way of analog to digital (A/D) interface 124 and resistors 121, 122 and 123, compares the value of impedance 202 to predetermined values stored in the memory of controller 130, and generates the *ENABLE control signal to turn on linear regulator 116 when the value of impedance 202 is substantially the same as one of the stored predetermined values, Linear regulator 116 produces a 2.7 DC voltage that switches off and on in response to the *ENABLE control signal. A/D interface 124 includes an analog to digital converter for converting the voltage created by the resistor divider formed by resistor 121 and resistor 202 of headset 200 to a value corresponding to the resistance value of resistor 202. Each accessory has a different value impedance 202 enabling controller 130 to identify each accessory by comparing the value of impedance 202 to predetermined values stored in the memory of controller 130. In the preferred embodiment, the value of impedance 202 is 10K ohms for headset accessory 200, 22k ohms for data cable accessory 300, and 56K ohms for a hands-free accessory (not shown). The predetermined values stored in the memory of controller 130 are ranges of values corresponding the value read by A/D interface 124 for each of the impedances 202. These stored values are 57 to 84 for an impedance 202 of 10K ohms in the headset accessory 200, 93 to 128 for an impedance 302 of 22K ohms in the data cable accessory 300, and 134 to 175 for an impedance of 56K ohms in the hands-free accessory. When the value read by A/D interface 124 falls in one of these stored value ranges, controller 130 can determine that the read value of impedance 202 is substantially the same as the stored value and generate the interface control signals for the corresponding headset accessory 200, data cable accessory 300, and hands-free accessory.

Figure 2:
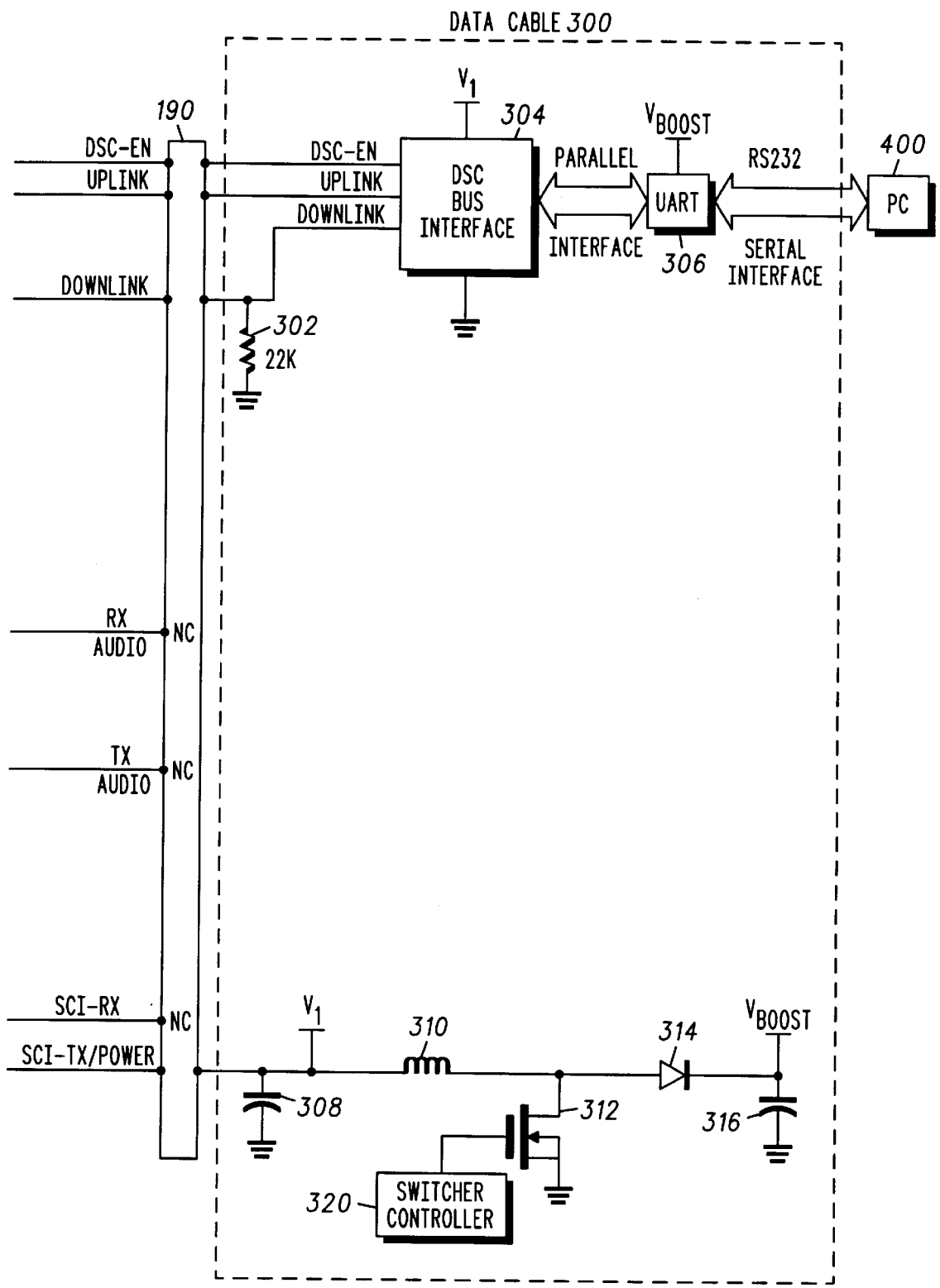
FIG. 2 is a block diagram of a data cable accessory 300.

The DSC bus interface device 125 generates the DSC-EN control signal and is coupled to the UPLINK bus and the DOWNLINK bus for communicating information to a data accessory. In FIG. 2, the DSC-EN control signal, UPLINK bus and DOWNLINK bus on connector 190 are coupled to DSC bus interface device 304, which, together with UART device 306, produces an RS-233 serial interface for communicating information to a personal computer PC 400. In the preferred embodiment, devices 125 and 304 and the encoding and decoding of information communicated therebetween are implemented as described in U.S. Pat. Nos. 5,237,570 and 5,297,142, incorporated herein in their entirety by reference.

Audio codec device 180 is coupled to controller 130 for applying audio signals from radiotelephone microphone 140 to transmitter 120 by way of audio switch 184, or audio signals from microphone 230 of headset accessory 200 to transmitter 120 by way of audio switch 183. Audio control signals are generated by controller 130 for enabling switch 183 when radiotelephone microphone 140 is used, and enabling switch 184 when microphone 230 of headset accessory 200 is used. Microphone 140 is coupled by resistor 141 and capacitor 142 to audio amplifier 145 by way of gain setting resistors 143 and 144. Amplifier 145 amplifies the microphone audio signals and couples them to switch 184.

Audio codec device 180 is also coupled to controller 130 for applying audio signals from the receiver 110 to radiotelephone speaker 150 by way of audio switch 181, or to speaker 220 of headset accessory 200 by way of audio switch 182. Audio control signals are generated by controller 130 for enabling switch 181 when radiotelephone speaker 150 is used, and enabling switch 182 when speaker 220 of headset accessory 200 is used. Receiver audio signals are coupled from switch 181 to amplifier 151 and 156 with resistor 155 for application to the minus terminal of speaker 150, and to amplifier 154 by way of gain setting resistors 152 and 153 for application to the plus terminal of speaker 150.

Referring next to FIG. 2, there is illustrated a data cable accessory 300 for providing an RS-232 serial interface for communicating information between radiotelephone 100 and a personal computer PC 400. In the preferred embodiment, impedance 302 of data cable accessory has a value of 22K ohms. Since the V1 supply voltage provided on the SCI-TX/POWER bus is 2.7 volts, conventional switching power supply circuitry 310, 320, 312 and 314 boosts the 2.7 volts to a value of 5 volts for powering UART device 306. Switching power supply circuitry is made up of inductor 310, FET transistor 312, switcher controller device 320 (such as an MC34063 DC-DC converter device available from Motorola, Inc.), and diode 314. UART device 306 is a conventional device, such as an NS16C450 device available from National Semiconductor, which has a parallel interface to DSC bus interface device 304 and a serial RS-232 interface to personal computer PC 400.

In summary, a unique interface provided by connector 190 couples radiotelephone 100 to headset accessory 200, data cable accessory 300, hands-free accessory, or a desktop charger accessory. Accessory 200 is a headset including a microphone 220 and a speaker 230 that may be plugged into a jack in radiotelephone 100 and worn by the user. Data cable accessory 300 provides an RS-233 serial interface for communicating information between radiotelephone 100 and a personal computer 400. Hands-free accessory allows the user to operate radiotelephone 100 without holding it. Desktop charger accessory charges the battery of radiotelephone 100. Controller 130 of radiotelephone 100 detects the presence of a 10K ohm resistor 202 to determine that accessory 200 is coupled to connector 190, the presence of a 22K ohm resistor 202 to determine that accessory 300 is coupled to connector 190, and the presence of a 56K ohm resistor 202 to determine that a hands-free accessory is coupled to connector 190. When accessories 200 and 300 are detected, linear regulator 116 is switched on by controller to provide a 2.7V voltage source for powering accessories 200 and 300. The bypass capacitors 208 and 308 for linear regulator 116 are disposed on respective accessories 200 and 300 so that they do not interfere with the high speed data transmitted by SCI bus device 114 on the SCI-TX/POWER bus. Therefore, the 2.7V voltage source and the transmit line TXD of SCI bus device 114 are both coupled to the same SCI-TX/POWER bus of connector 190 for minimizing the number of interface signals.

What is claimed is:

1. Interface apparatus for coupling a radiotelephone to one of a first and second accessories having respective first and second predetermined impedances, the first and second predetermined impedances having respective first and second values, said interface apparatus comprising:

an analog to digital converter for detecting the value of the first and second predetermined impedances;

a switch for coupling a power source to the accessory in response to a control signal:

a controller having a memory storing the first and second values and being coupled to the analog to digital converter for comparing the detected value to the stored first and second values and generating the control signal when the detected value is substantially the same as one of the stored first and second values;

and first and second bypass capacitors disposed on the first and second accessories, respectively, and being coupled to the switch.

2. Interface apparatus for coupling a radiotelephone to one of a first and second accessories having respective first and second predetermined impedances, the first and second predetermined impedances having respective first and second values, said interface apparatus comprising:

an analog to digital converter for detecting the value of the first and second predetermined impedances;

a switch for coupling a power source to the accessory in response to a control signal;

a controller having a memory storing the first and second values and being coupled to the analog to digital converter for comparing the detected value to the stored first and second values and generating the control signal when the detected value is substantially the same as one of the stored first and second values; and wherein said first accessory further includes a data device for encoding and decoding information signals, said interface apparatus further comprising:

a data bus coupled to the data device; and said controller further being coupled to the data bus for transmitting and receiving information signals to and from, respectively, the data device when the detected value is substantially the same as the stored first value.

3. Interface apparatus for coupling a radiotelephone to one of a first and second accessories having respective first and second predetermined impedances, the first and second predetermined impedances having respective first and second values, said interface apparatus comprising:

an analog to digital converter for detecting the value of the first and second predetermined impedances;

a switch for coupling a power source to the accessory in response to a control signal;

a controller having a memory storing the first and second values and being coupled to the analog to digital converter for comparing the detected value to the stored first and second values and generating the control signal when the detected value is substantially the same as one of the stored first and second values; and wherein said second accessory further includes audio amplifying circuitry coupled to a microphone and a speaker, said interface apparatus further comprising:

a speaker audio bus coupled to the audio amplifying circuitry;

a microphone audio bus coupled to the audio amplifying circuitry; and said switch coupling the power source to the audio amplifying circuitry in response to the control signal.

4. A radiotelephone adapted to be coupled to an accessory having a predetermined impedance and audio amplifying circuitry coupled to a microphone and a speaker, said radiotelephone comprising:

a receiver operable on cellular radio channels for receiving information signals;

a transmitter operable on cellular radio channels for transmitting information signals; and a controller coupled to the receiver and the transmitter for communicating information signals, and further coupled to the accessory for detecting the predetermined impedance and switching a power source to the audio amplifying circuitry in response to detection of the predetermined impedance.

5. The radiotelephone according to claim 4 further including a bypass capacitor disposed on the accessory and being coupled to the power source.

6. Interface apparatus for coupling a radiotelephone to an accessory having a predetermined impedance, the predetermined impedance having a value, said interface apparatus comprising:

an analog to digital converter for detecting the value of the predetermined impedance;

a switch for coupling a power source to the accessory in response to a control signal;

a controller having a memory storing the value and being coupled to the analog to digital converter for comparing the detected value to the stored value and generating the control signal when the detected value is substantially the same as the stored value; and a bypass capacitor disposed on the accessory and being coupled to the switch.

7. Interface apparatus for coupling a radiotelephone to an accessory having a predetermined impedance, the predetermined impedance having a value, said interface apparatus comprising:

an analog to digital converter for detecting the value of the predetermined impedance;

a switch for coupling a power source to the accessory in response to a control signal;

a controller having a memory storing the value and being coupled to the analog to digital converter for comparing the detected value to the stored value and generating the control signal when the detected value is substantially the same as the stored value; and wherein said accessory further includes a data device for encoding and decoding information signals, said interface apparatus further comprising:

a data bus coupled to the data device; and said controller further being coupled to the data bus for transmitting and receiving information signals to and from, respectively, the data device when the detected value is substantially the same as the stored value.

8. Interface apparatus for coupling a radiotelephone to an accessory having a predetermined impedance, the predetermined impedance having a value, said interface apparatus comprising:

an analog to digital converter for detecting the value of the predetermined impedance;

a switch for coupling a power source to the accessory in response to a control signal;

a controller having a memory storing the value and being coupled to the analog to digital converter for comparing the detected value to the stored value and generating the control signal when the detected value is substantially the same as the stored value; and wherein said accessory further includes audio amplifying circuitry coupled to a microphone and a speaker, said interface apparatus further comprising:

a speaker audio bus coupled to the audio amplifying circuitry;

a microphone audio bus coupled to the audio amplifying circuitry; and said switch coupling the power source to the audio amplifying circuitry in response to the control signal.

9. A method of interfacing a radiotelephone to an accessory having predetermined impedance and audio amplifying circuitry coupled to a microphone and a speaker, the predetermined impedance having a value, said method comprising the steps:

detecting the value of the predetermined impedance;

comparing the detected value to a stored value and generating a control signal when the detected value is substantially the same as the stored value; and switching a power source to the audio amplifying circuitry in response to the control signal.

* * * * *